(12) United States Patent
Yokoyama et al.

(10) Patent No.: US 8,708,721 B2
(45) Date of Patent: Apr. 29, 2014

(54) CONNECTOR

(71) Applicants: Japan Aviation Electronics Industry, Limited, Tokyo (JP); JAE Taiwan, Ltd., Taichung (TW)

(72) Inventors: Yohei Yokoyama, Tokyo (JP); Masafumi Kodera, Taichung (TW)

(73) Assignees: Japan Aviation Electronics Industry, Limited, Tokyo (JP); JAE Taiwan Ltd., Taichung (TW)

( * ) Notice: Subject to any disclaimer, the term of this patent is extended or adjusted under 35 U.S.C. 154(b) by 88 days.

(21) Appl. No.: 13/629,874

(22) Filed: Sep. 28, 2012

(65) Prior Publication Data

US 2013/0084724 A1   Apr. 4, 2013

(30) Foreign Application Priority Data

Sep. 30, 2011 (JP) .................. 2011-217858

(51) Int. Cl.
*H01R 13/62* (2006.01)
(52) U.S. Cl.
USPC ........................................... 439/160
(58) Field of Classification Search
USPC ................................. 439/157–160
See application file for complete search history.

(56) References Cited

U.S. PATENT DOCUMENTS

| | | | | |
|---|---|---|---|---|
| 4,810,200 A | * | 3/1989 | Sakamoto | 439/155 |
| 5,145,389 A | * | 9/1992 | Okubo | 439/159 |
| 5,152,697 A | * | 10/1992 | Abe et al. | 439/152 |
| 5,268,821 A | * | 12/1993 | Wong | 439/160 |
| 5,499,925 A | * | 3/1996 | Lwee | 439/157 |
| 5,707,245 A | * | 1/1998 | Yamamoto et al. | 439/160 |
| 5,730,610 A | * | 3/1998 | Hsia et al. | 439/160 |
| 5,863,212 A | * | 1/1999 | Duesterhoeft | 439/160 |
| 5,921,792 A | * | 7/1999 | Chen | 439/160 |
| 6,015,309 A | * | 1/2000 | Nakamura et al. | 439/159 |
| 6,042,401 A | * | 3/2000 | Oguchi et al. | 439/159 |
| 6,089,889 A | * | 7/2000 | Chiou et al. | 439/159 |
| 6,095,835 A | * | 8/2000 | Oguchi | 439/159 |
| 6,247,946 B1 | * | 6/2001 | Nakamura et al. | 439/159 |
| 6,364,674 B1 | * | 4/2002 | Kajiura | 439/159 |

(Continued)

FOREIGN PATENT DOCUMENTS

| | | |
|---|---|---|
| JP | 2008-108695 | 5/2008 |
| JP | 2009-181787 | 8/2009 |

OTHER PUBLICATIONS

Japanese Office Action dated Jan. 24, 2013 in JP 2011-217858 (With English Translation).

*Primary Examiner* — Briggitte R Hammond
(74) *Attorney, Agent, or Firm* — Collard & Roe, P.C.

(57) ABSTRACT

A connector is able to accommodate an object (for example, a tray on which a card is mounted). The connector comprises an ejection member and a backup portion. The ejection member includes a receiver and an ejecting portion. The receiver is able to be pressed by an operating member (for example, a pin). The ejection member pivots from an accommodating position to an eject position when the receiver is pressed. The ejecting portion ejects the object when the ejection member pivots toward the eject position. When the receiver receives an excessive force from the operating member, the backup portion is brought into abutment with the receiver so as to backup the receiver.

14 Claims, 6 Drawing Sheets

(56) References Cited

U.S. PATENT DOCUMENTS

| | | | |
|---|---|---|---|
| 6,406,312 B1 * | 6/2002 | Heitkamp | 439/160 |
| 7,766,678 B1 * | 8/2010 | Abe | 439/159 |
| D669,474 S * | 10/2012 | Yokoyama et al. | D14/432 |
| 2009/0267677 A1 | 10/2009 | Myers et al. | |
| 2010/0099284 A1 * | 4/2010 | Sambhandam Palani et al. | 439/159 |
| 2012/0220146 A1 * | 8/2012 | Yokoyama et al. | 439/159 |

\* cited by examiner

CONNECTOR

CROSS REFERENCE TO RELATED APPLICATIONS

Applicants claim priority under 35 U.S.C. §119 of Japanese Patent Applications No. JP2011-217858 filed Sep. 30, 2011.

BACKGROUND OF THE INVENTION

This invention relates to a connector connectable to a card such as a Subscriber Identity Module (SIM) card.

For example, this type of connector is disclosed in JP-A 2008-108695 or US2009/267677 A, contents of which are incorporated herein by reference.

The connector of JP-A 2008-108695 is connectable to a memory card such as a Multi Media Card (MMC). The connector is configured to accommodate and eject the memory card (the card) mounted on a tray. In other words, an object which is directly accommodated in and ejected from the connector is the tray. The tray is formed with a hole into which a pin (operating member) is insertable. When the pin which is inserted through the hole presses a push lever, a lock by a lock mechanism is unlocked so that the card is ejected together with the tray. The aforementioned eject mechanism is provided in the connector itself.

Similarly, the connector of US2009/267677 A is connectable to a card such as a SIM card mounted on a tray. Similar to the connector of JP-A 2008-108695, an object which is directly accommodated in and ejected from this connector is the tray. However, an eject mechanism configured to eject the tray is provided not in the connector but in an electronic equipment in which the connector is installed.

The eject mechanism of JP-A 2008-108695 has a problem that it is difficult to reduce a size of the connector. Although the eject mechanism of US2009/267677 A is able to be constituted of relatively small number of members, the eject mechanism is provided in the electronic equipment itself. Accordingly, various problems may be caused in production (for example, in a positional adjustment).

Moreover, the eject mechanism may receive an excessive pressing force from the pin (operating member). Accordingly, the connector is required to have such a strength as to withstand the excessive pressing force.

SUMMARY OF THE INVENTION

It is therefore an object of the present invention to provide a connector having a relatively high strength against a pressure from an operating member while the connector comprises an eject mechanism which has an easily reducible and simple structure.

One aspect of the present invention provides a connector which is able to accommodate at least a part of an object. The connector comprises an ejection member and a backup portion. The ejection member is pivotable between an eject position and an accommodating position. The ejection member includes a receiver and an ejecting portion. The receiver has a front surface and a rear surface. The front surface of the receiver is arranged so as to be pressed along a pressing direction by using an operating member which is other than the connector. The ejection member is designed to pivot from the accommodating position to the eject position when the front surface is pressed along the pressing direction. The ejecting portion ejects the object along an ejecting direction opposite to the pressing direction when the ejection member pivots toward the eject position. The backup portion is located within a predetermined range in a vertical direction perpendicular to the ejecting direction. An upper end and a lower end in the vertical direction of the receiver define an upper limit and a lower limit of the predetermined range, respectively. The backup portion is brought into abutment with the rear surface of the receiver when the front surface of the receiver receives a force which is so excessive as to force the ejection member to pivot beyond the eject position. The abutment of the backup portion backs up the receiver.

An appreciation of the objectives of the present invention and a more complete understanding of its structure may be had by studying the following description of the preferred embodiment and by referring to the accompanying drawings.

Figure 1:
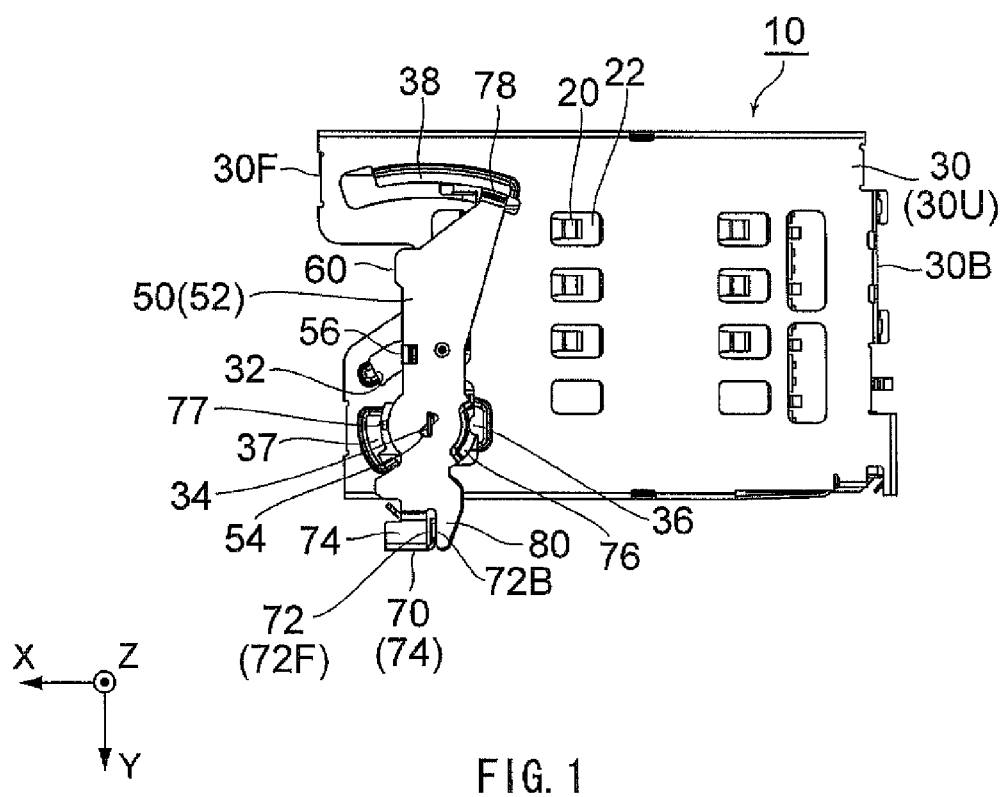
FIG. 1 is a top view showing a connector according to an embodiment of the present invention, wherein an ejection member of the connector is located at an accommodating position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
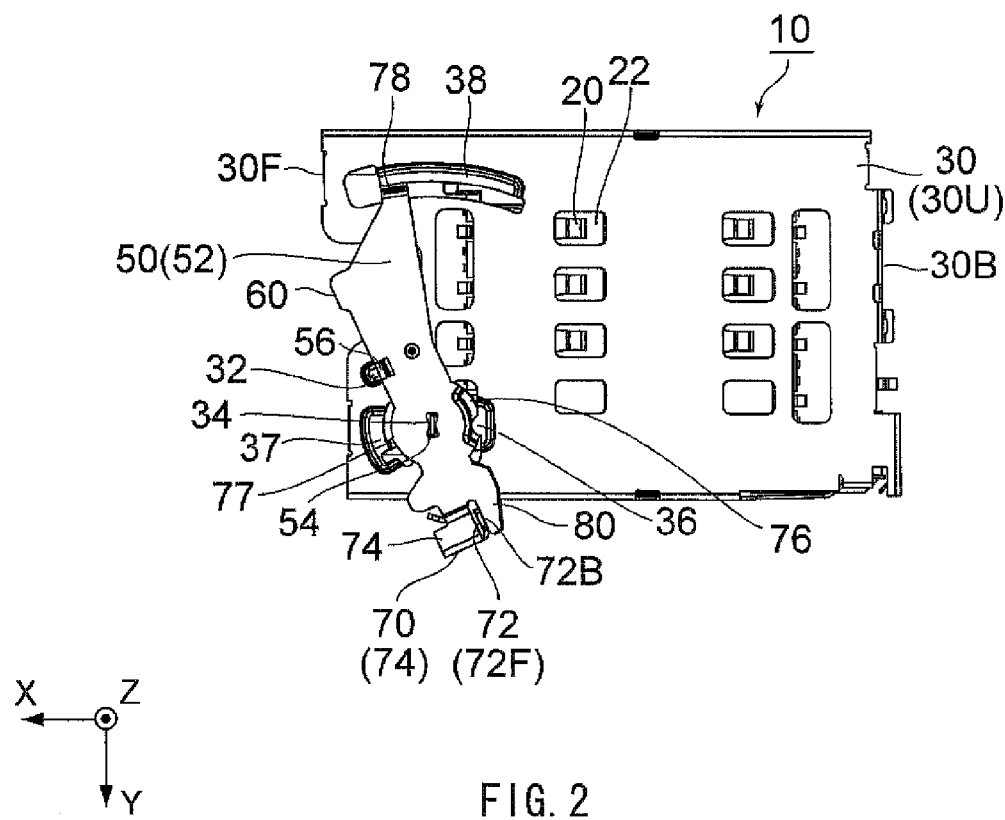
FIG. 2 is another top view showing the connector of FIG. 1, wherein the ejection member is located at an eject position.
Figure 3:
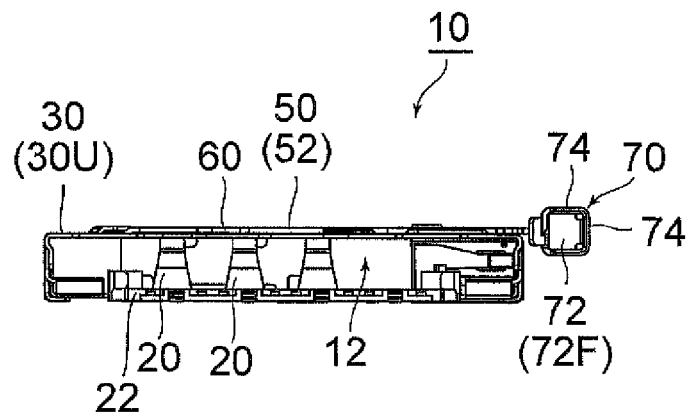
FIG. 3 is a front view showing the connector of FIG. 1.

Referring to FIGS. 1 to 5, a connector 10 according to an embodiment of the present invention comprises an accommodating portion 12 formed therewithin (see FIG. 3). The accommodating portion 12 has an opening at a front end (i.e. at the positive X-side end). The connector 10 is able to accommodate a part of a tray (object) 100 (see FIG. 4) in the accommodating portion 12 along the negative X-direction (pressing direction). The connector 10 further comprises an ejection member 50 made of a metal. The connector 10 is ejectable the tray 100 along the positive X-direction (ejecting direction) by turning the ejection member 50. The tray 100 according to the present embodiment is configured so that a card (not shown) such as a SIM card is mounted thereon. The card and the connector 10 are electrically connected with each other when the tray 100 (i.e. the card) is accommodated in the accommodating portion 12. In other words, according to the present embodiment, an object which the connector 10 is able to accommodate is the tray 100 on which the card (not shown) configured to be connected to the connector 10 is mountable.

Figure 4:
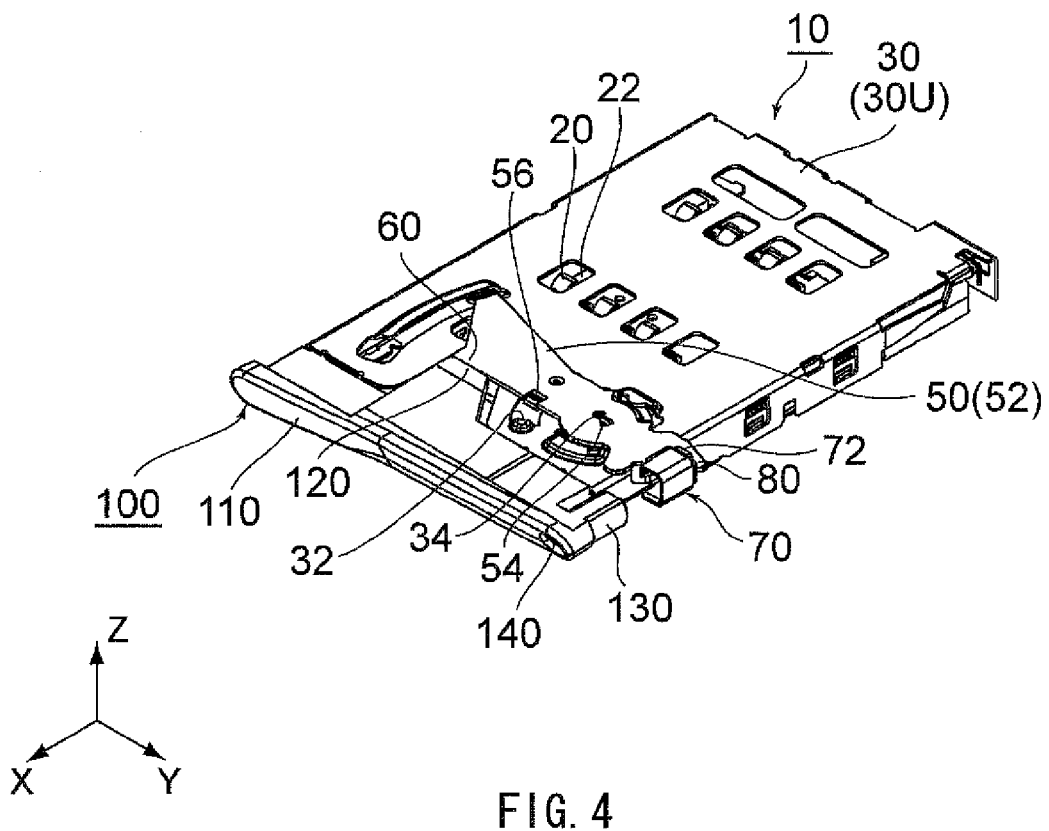
FIG. 4 is a perspective view showing the connector of FIG. 1 and a tray (an object), wherein the tray is accommodated in the connector.

As can be seen from FIGS. 3 and 4, the tray 100 according to the present embodiment has a front wall 110 formed on the positive X-side end thereof. The tray 100 has such a size and a shape so that a remaining part (i.e. a part other than the front wall 110) of the tray 100 is accommodated in the accommodating portion 12 while the front wall 110 is exposed outside of the connector 10. In detail, the front wall 110 according to the present embodiment covers the front end opening of the accommodating portion 12 when the tray 100 is partially accommodated in the accommodating portion 12. As shown in FIG. 4, the front wall 110 is provided with a bar-like portion 130 at the positive Y-side end thereof. The bar-like portion 130 extends along the negative X-direction (pressing direction). The bar-like portion 130 is formed with an insertion hole 140. The insertion hole 140 pierces the bar-like portion 130 along the X-direction (front-to-rear direction). As described later, when the tray 100 is accommodated in the accommodating portion 12, the tray 100 is operable to be ejected by an operation member (a pin) which is inserted into the insertion hole 140. The insertion hole 140 is configured to guide the inserted operation member. The tray 100 is further provided with a force-applied portion 120. The force-applied portion 120 receives a force along the positive X-direction (ejecting direction) when the tray 100 is operated to be ejected.

Referring to FIG. 3, the connector 10 according to the present embodiment comprises, in addition to the aforementioned ejection member 50, a plurality of contacts 20 each made of a conductive material, a holding member 22 made of an insulating material and a cover shell 30 made of a metal. The contacts 20 are connectable to respective terminals of the card (not shown) accommodated in the accommodating portion 12. The holding member 22 holds the contacts 20. The cover shell 30 forms the accommodating portion 12 together with the holding member 22. The ejection member 50 is attached to the cover shell 30.

Referring to FIGS. 1 to 5, the cover shell 30 has an upper portion 30U which is located at upper side (i.e. positive Z-side) thereof. The ejection member 50 is attached to the upper portion 30U of the cover shell 30 so as to be pivotable. As shown in FIGS. 1 and 2, the cover shell 30 has a front end 30F and a rear wall 30B on opposite ends in the X-direction, respectively. The cover shell 30 is formed with a supporting-structure which is used to support the ejection member 50. The aforementioned supporting-structure is provided on the upper portion 30U so as to be located nearer to the front end 30F than the rear wall 30B. The supporting-structure is mainly comprised of a shell-side stopper 32, a pivot piece 34, a first holding portion 36, a second holding portion 37 and a third holding portion 38. The shell-side stopper 32 is located on the positive Y-side of the upper portion 30U in the Y-direction (lateral direction), and located in the vicinity of the front end 30F in the X-direction. In detail, the upper portion 30U is partially cut out so as to be formed with an open portion which extends in a direction oblique to the X-direction. The open portion has a front edge (i.e. the positive X-side edge). The front edge of the open portion is bent to protrude in the positive Z-direction (i.e. protrude upward) so that the shell-side stopper 32 is formed. The shell-side stopper 32 faces obliquely rearward (i.e. faces in a direction oblique to both the negative X-direction and the negative Y-direction). The pivot piece 34 is provided to be located obliquely rearward of the shell-side stopper 32. In detail, the shell-side stopper 32 and the pivot piece 34 are located on a line oblique to both the negative X-direction and the positive Y-direction. The pivot piece 34 is a small piece which is parallel to the YZ-plane. In detail, the pivot piece 34 extends long in the Y-direction while protruding in the positive Z-direction (i.e. upward). The first holding portion 36 and the second holding portion 37 are provided so as to put the pivot piece 34 therebetween in the X-direction (front-to-rear direction). The upper portion 30U is formed with two ditches. One of the two ditches is formed between the first holding portion 36 and the pivot piece 34. A remaining one of the two ditches is formed between the second holding portion 37 and the pivot piece 34. Each of the first holding portion 36 and the second holding portion 37 protrudes in the positive Z-direction so as to be formed with a space at the negative Z-side (i.e. lower side) thereof. The spaces under the first holding portion 36 and the second holding portion 37 communicate with the ditches, respectively. The third holding portion 38 is formed at a position opposite to the pivot piece 34 across the shell-side stopper 32 in the Y-direction (i.e. formed on the negative Y-side of the upper portion 30U). The upper portion 30U further has a ditch formed between the third holding portion 38 and the pivot piece 34. The third holding portion 38 protrudes in the positive Z-direction so as to be formed with a space at the negative Z-side thereof (i.e. under the third holding portion 38). The space under the third holding portion 38 communicates with the ditch beside the third holding portion 38.

Figure 5:
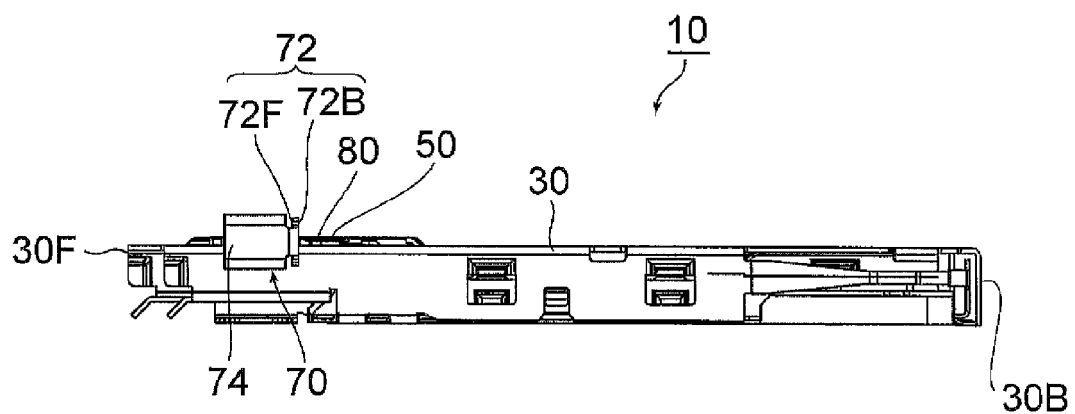
FIG. 5 is a side view showing the connector of FIG. 1.
Figure 6:
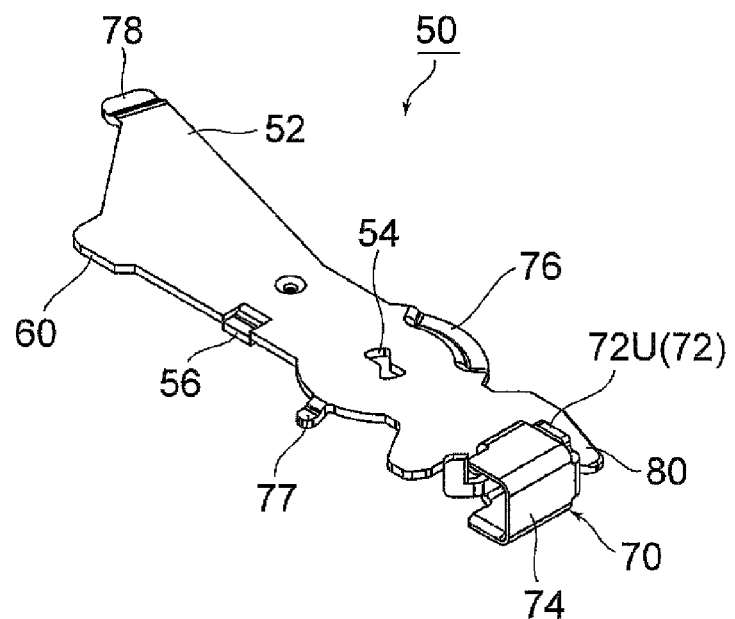
FIG. 6 is a perspective view showing the ejection member of the connector of FIG. 1.
Figure 7:
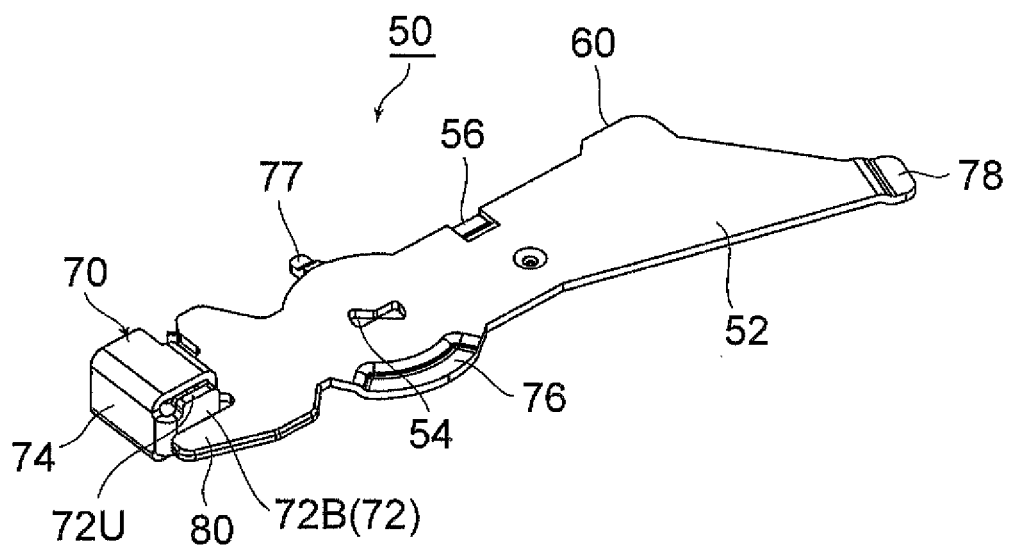
FIG. 7 is another perspective view showing the ejection member of FIG. 6.
Figure 8:
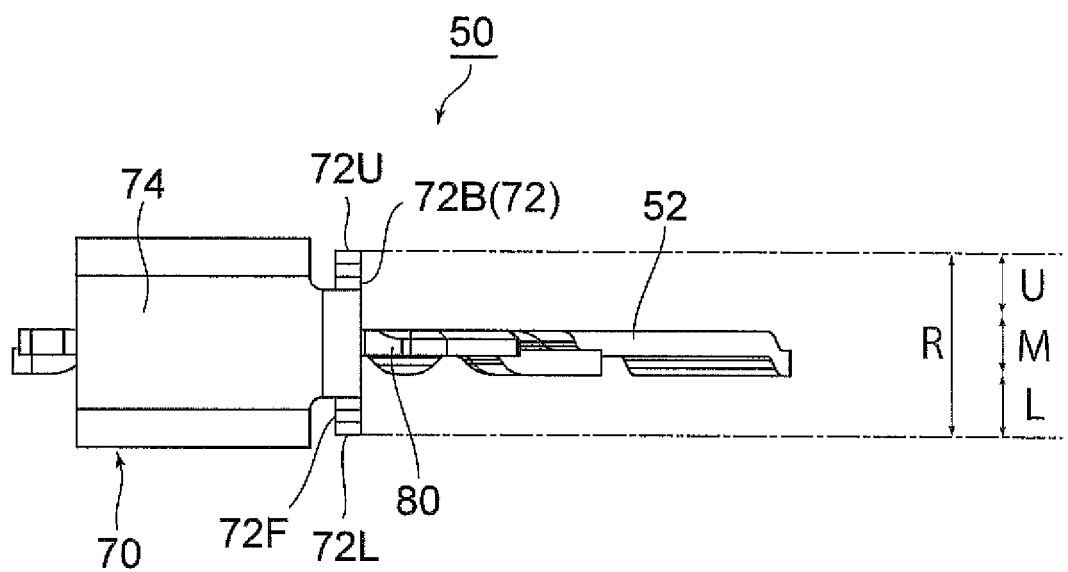
FIG. 8 is a side view showing the ejection member of FIG. 6.
Figure 9:
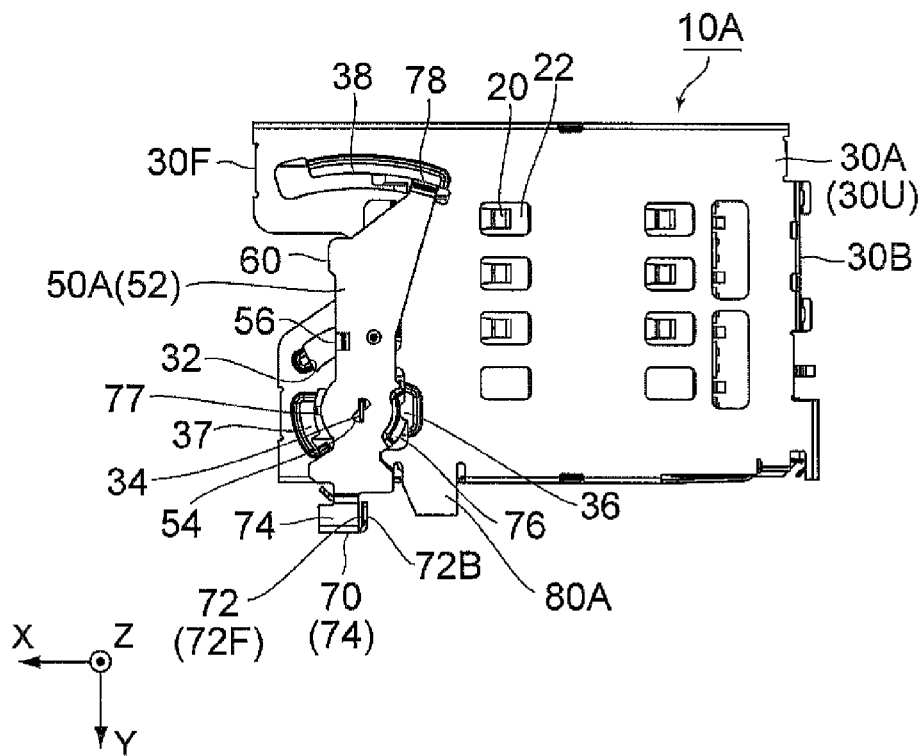
FIG. 9 is a top view showing a modification of the connector of FIG. 1, wherein an ejection member is located at the accommodating position.
Figure 10:
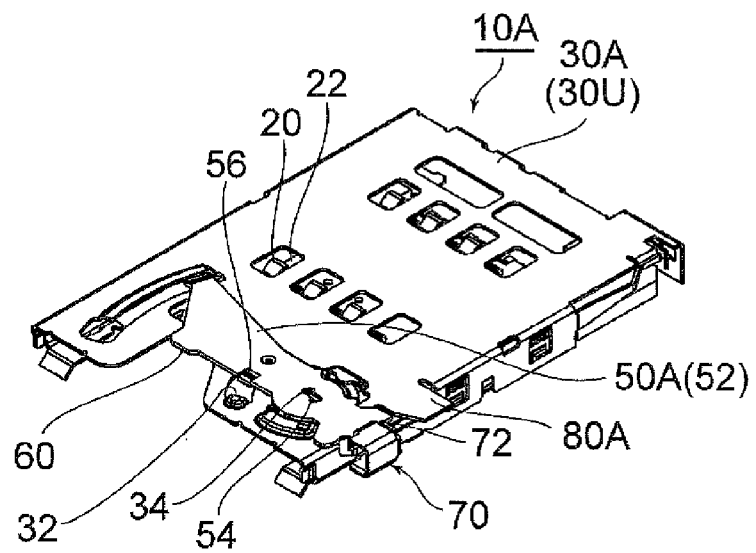
FIG. 10 is a perspective view showing the connector of FIG. 9.
Figure 11:
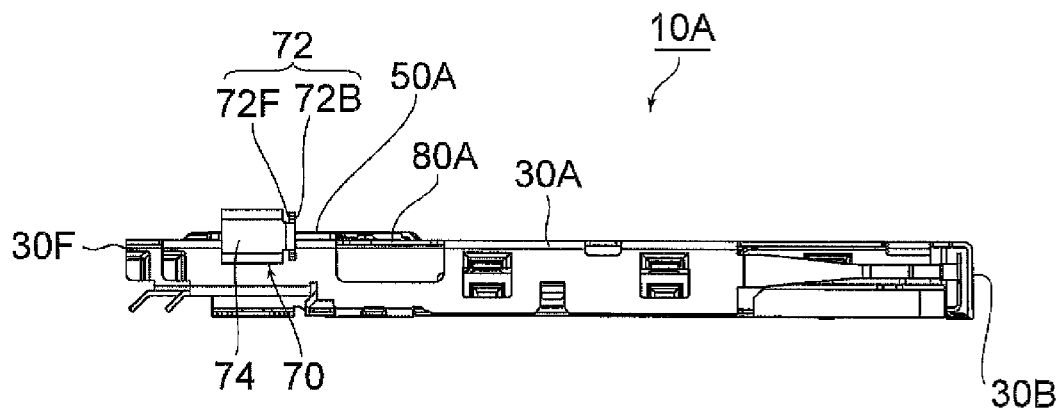
FIG. 11 is a side view showing the connector of FIG. 9.
Figure 11:
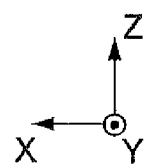

Referring to FIGS. 6 to 8, the ejection member 50 is formed by bending a single metal plate to have a plate-like body portion 52. As can be seen from FIGS. 1 to 5, the body portion 52 extends in parallel to the XY-plane under a state where the ejection member 50 is attached to the cover shell 30. As shown in FIGS. 6 and 7, the body portion 52 is formed with a pivot portion 54. The pivot portion 54 is a through hole having a dumbbell-like or eight-like shape. The pivot portion 54 is located in the vicinity of one-third position of the body portion 52 in a lengthwise direction (i.e. a direction along which the body portion 52 extends long). As can be seen from FIGS. 1, 2 and 4, the pivot portion 54 receives the pivot piece 34 of the cover shell 30. When the pivot piece 34 is received in the pivot portion 54, the ejection member 50 is supported by the cover shell 30 so as to be pivotable. The ejection member 50 is pivotable between an accommodating position (see FIG. 1) and an eject position (see FIG. 2). As shown in FIGS. 6 and 7, according to the present embodiment, the body portion 52 is provided with a pivot stopper 56 at a front edge thereof. In detail, the pivot stopper 56 is located in the vicinity of one half position of the body portion 52 in the lengthwise direction. As shown in FIG. 2, when the ejection member 50 is located at the eject position, the pivot stopper 56 is in abutment with the shell-side stopper 32 of the cover shell 30. Accordingly, the ejection member 50 is unable to pivot beyond the eject position. In other words, the eject position is one of boundaries of pivoting range of the ejection member 50.

As shown in FIGS. 6 and 7, the ejection member 50 is provided with an ejecting portion 60 and a receive portion 70. The ejecting portion 60 and the receive portion 70 are provided on opposite sides across the pivot portion 54 (i.e. across the center of pivot of the ejection member 50), respectively. In other words, the pivot portion 54 is located between the ejecting portion 60 and the receive portion 70.

The receive portion 70 is configured to receive a leading end of the operating member (pin) when the accommodated tray 100 is ejected. As shown in FIGS. 5 to 7, the receive portion 70 according to the present embodiment is comprised of a receiver 72 and four side walls 74. The receiver 72 has a rectangular shape so as to have four sides. The side walls 74 are provided so as to correspond to the four sides of the receiver 72, respectively. As shown in FIG. 4, the receive portion 70 is designed so that the bar-like portion 130 (especially, the insertion hole 140) of the tray 100 and the receive portion 70 are located on a single line which extends in the X-direction (front-to-rear direction) when the ejection member 50 is located at the accommodating position. Accordingly, when the operating member (pin) is inserted and pushed into the insertion hole 140 in the negative X-direction, the leading end of the operating member (pin) is smoothly received in the receive portion 70. Thus, the insertion hole 140 formed in the bar-like portion 130 serves as a guide portion which guides the operating member (pin) toward the receive portion 70.

The receiver 72 according to the present embodiment is a furthest wall of the receive portion 70 in the negative X-direction (pressing direction) when the ejection member 50 is located at the accommodating position (see FIG. 1). The receive portion 70 has a boxlike shape which opens in the positive X-direction (ejecting direction). The receiver 72 is directly connected to the most outer side wall 74 in the positive Y-direction while being not directly connected to the other side walls 74.

The receiver 72 has a front surface 72F and a rear surface 72B. The front surface 72F of the receiver 72 is arranged so as to be pressed along the negative X-direction by using the operating member which is other than the connector 10. More specifically, when the ejection member 50 is located at the accommodating position (see FIG. 1), it is possible to insert the leading end of the operating member into the receive portion 70 to press the front surface 72F of the receiver 72. The ejection member 50 is designed to pivot on the pivot portion 54 from the accommodating position to the eject position (i.e. until the pivot stopper 56 is brought into abutment with the shell-side stopper 32) when the front surface 72F is pressed along the negative X-direction. The ejecting portion 60 ejects the tray 100 along the positive X-direction when the ejection member 50 pivots toward the eject position. In detail, when the ejection member 50 pivots, the ejecting portion 60 moves in the positive X-direction (pressing direction) so as to apply a force along the positive X-direction to the force-applied portion 120 of the tray 100. The aforementioned force pushes out the force-applied portion 120 in the positive X-direction. Accordingly, the tray 100 accommodated in the accommodating portion 12 is ejected in the positive X-direction (ejecting direction). As can be seen from the above description, an ejection mechanism according to the present embodiment has a simple structure. Moreover, it is easy to reduce the ejection mechanism.

As shown in FIGS. 1 and 2, the ejection member 50 is provided with a first held portion 76, a second held portion 77 and a third held portion 78 which correspond to the first holding portion 36, the second holding portion 37 and the third holding portion 38 of the cover shell 30, respectively. As shown in FIGS. 6 and 7, the first held portion 76 and the second held portion 77 are located to face each other across the pivot portion 54. More specifically, the first held portion 76 and the second held portion 77 are provided so that a line which connects the first held portion 76 and the second held portion 77 crosses another line which connects the ejecting portion 60 and the receive portion 70. The third held portion 78 is provided at a position which is furthest from the pivot portion 54. More specifically, the third held portion 78 according to the present embodiment is formed on an end portion of the ejection member 50 in the lengthwise direction. Each of the first held portion 76, the second held portion 77 and the third held portion 78 descends in the negative Z-direction (i.e. downward) from the body portion 52. In other words, each of the first held portion 76, the second held portion 77 and the third held portion 78 is located below the body portion 52. As can be seen from FIGS. 1 and 2, the first held portion 76, the second held portion 77 and the third held portion 78 are received in the spaces under the first holding portion 36, the second holding portion 37 and the third holding portion 38, respectively. As can be seen from FIGS. 1 and 2, the first held portion 76, the second held portion 77 and the third held portion 78 are movable in the XY-plane in the spaces under the first holding portion 36, the second holding portion 37 and the third holding portion 38, respectively. Movements in the positive Z-direction of the first held portion 76, the second held portion 77 and the third held portion 78 are regulated by the first holding portion 36, the second holding portion 37 and the third holding portion 38, respectively. In other words, the ejection member 50 is held by the upper portion 30U of the cover shell 30 so as not to be detached from the cover shell 30 while being pivotable between the accommodating position and the eject position.

As shown in FIGS. 1, 2 and 4 to 8, the ejection member 50 according to the present embodiment is provided with a backup portion 80. The backup portion 80 according to the present embodiment is integrally formed with the ejection member 50. In other words, the backup portion 80 according to the present embodiment is a part of the ejection member 50. The backup portion 80 is brought into abutment with the rear surface 72B of the receiver 72 when the front surface 72F of the receiver 72 receives a force which is so excessive as to force the ejection member 50 to pivot beyond the eject position. The abutment of the backup portion 80 backs up (i.e. supports) the receiver 72 so that the receiver 72 is prevented from being deformed to be damaged. The backup portion 80 according to the present embodiment is nearly in contact with the rear surface 72B of the receiver 72 when any load is not applied to the receiver 72. However, the backup portion 80 may be configured differently, provided that the receiver 72 is able to be prevented from being permanently deformed in the negative X-direction. For example, the backup portion 80 may be arranged to be apart from the receiver 72 under a natural state (i.e. a state where a force is not applied to the receiver 72). However, if a distance between the backup portion 80 and the receiver 72 is too large, the receiver 72 might not be supported properly when the receiver 72 receives the excessive force. Accordingly, it is preferred that the distance between the backup portion 80 and the receiver 72 under the natural state be less than or equal to a plate thickness of a metal plate from which the ejection member 50 is formed. The backup portion 80 according to the present embodiment is configured as described above so that it is possible to obtain a relatively high strength.

As shown in FIG. 8, the backup portion 80 is located just behind the receiver 72. In detail, the receiver 72 has an upper end 72U and a lower end 72L in the Z-direction (vertical direction). The upper end 72U and the lower end 72L of the receiver 72 define an upper limit and a lower limit of the predetermined range R, respectively. The backup portion 80 is located within the predetermined range R in the Z-direction (vertical direction). The backup portion 80 receives a force along the negative X-direction under a backup state where the backup portion 80 backs up the receiver 72. The pivot stopper 56 receives a force along the negative X-direction from the shell-side stopper 32 under the backup state (see FIG. 2). It is necessary to prevent that the aforementioned two forces (i.e.

twisting forces under the backup state) twist the ejection member 50. Specifically, it is preferred that a position where the pivot stopper 56 is brought into abutment with the shell-side stopper 32 be closed to a position where the backup portion 80 is brought into abutment with the receiver 72 in the Z-direction. According to the present embodiment, the pivot stopper 56 is located within the predetermined range R. Accordingly, the pivot stopper 56 is brought into abutment with the shell-side stopper 32 of the shell cover 30 within the predetermined range R (i.e. in the vicinity of an abutment position where the backup portion 80 is brought into abutment with the receiver 72). Moreover, according to the present embodiment, when the predetermined range R is divided into imaginary three equal ranges (specifically, an upper range U, a middle range M and a lower range L) in the vertical direction, the backup portion 80 and the pivot stopper 56 are located within the middle range M (i.e. a middle range of the aforementioned three ranges). Accordingly, it is possible to more certainly decrease an influence by the twisting force under the backup state. In addition to the twisting force under the backup state, the ejection member 50 receives another twisting force. In detail, while the tray 100 is ejected, the receiver 72 receives a force along the negative X-direction. In the meantime, the ejecting portion 60 receives a force along the negative X-direction from the force-applied portion 120 of the tray 100 (see FIG. 4). It is also necessary to prevent that the aforementioned two forces (i.e. the twisting force under ejection) twist the ejection member 50. Accordingly, it is preferred that the force be applied to the force-applied portion 120 within the predetermined range R. According to the present embodiment, the ejecting portion 60 is located within the middle range M (i.e. the middle range of the aforementioned three ranges) in the vertical direction. Accordingly, it is possible to more certainly decrease an influence by the twisting force under ejection of the tray 100.

As shown in FIGS. 1 and 2, the backup portion 80 according to the present embodiment is formed by extending the body portion 52. The backup portion 80 is located in the XY-plane under a state where the ejection member 50 is attached to the cover shell 30. In other words, the backup portion 80 has a plate-like shape extending in the XY-plane. The backup portion 80 may be formed by folding back an extending part of the body portion 52 several times. However, if a single metal plate has enough strength for backup, it is preferred that the backup portion 80 have a single plate-like shape similar to the present embodiment in order to reduce the production cost.

As shown in FIGS. 6 and 7, the backup portion 80 according to the present embodiment has a triangular shape. In detail, the backup portion 80 tapers as extends away from the pivot portion 54 (i.e. the center of pivot) of the ejection member 50. The backup portion 80 receives the rear surface 72B of the receiver 72 at a front edge (i.e. an edge portion on a front end) thereof when the excessive force is applied to the receiver 72. The backup portion 80 has the aforementioned tapering shape so that it is possible to reduce a stress which is applied to a boundary part between the backup portion 80 and the body portion 52.

This invention is not limited to the aforementioned embodiment. For example, although the backup portion 80 according to the aforementioned embodiment is formed as a part of the ejection member 50, the backup portion 80 and the ejection member 50 may be formed separately from each other.

Figure 12:
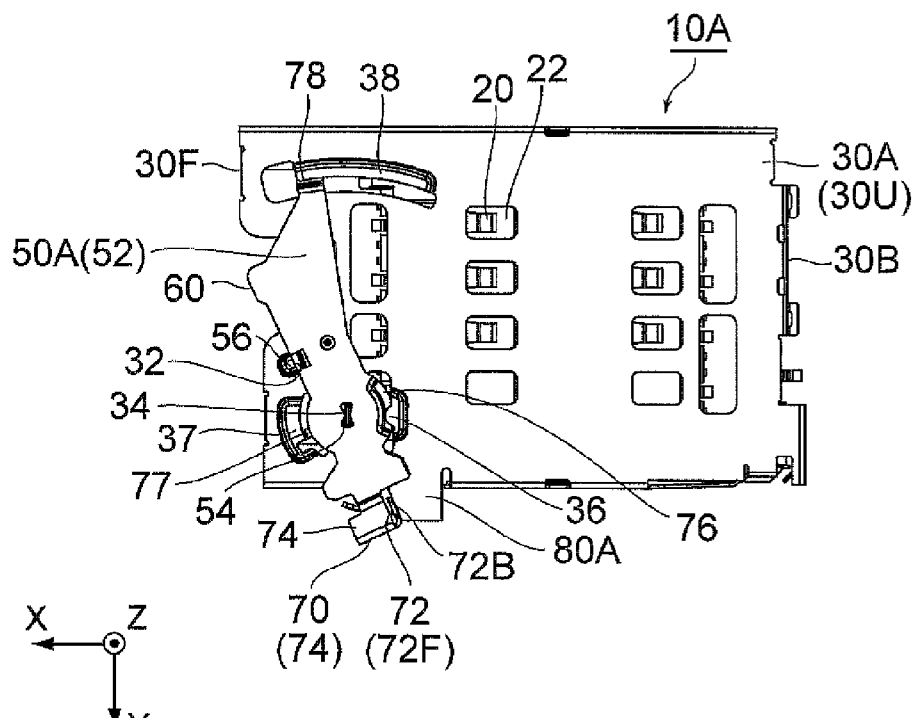
FIG. 12 is a top view showing the connector of FIG. 9, wherein the ejection member is located at the eject position.

Referring to FIGS. 9 to 12, a connector 10A according to a modification of the aforementioned embodiment comprises a cover shell 30A, an ejection member 50A and a backup portion 80A. The cover shell 30A, the ejection member 50A and the backup portion 80A are configured similar to the aforementioned embodiment except that the backup portion 80A is formed integrally not with the ejection member 50A but with the cover shell 30A. The backup portion 80A is a plate-like part of the cover shell 30A. This plate-like part projects from the cover shell 30A in the positive Y-direction so as to be flush with the cover shell 30A. The backup portion 80A tapers as extends in the positive Y-direction. The backup portion 80A is formed with a front edge which obliquely crosses both the X-direction and the Y-direction. A position and a shape of the backup portion 80A are designed so as to be able to backup the receiver 72. More specifically, as shown in FIG. 12, the backup portion 80A is close to or in contact with the rear surface 72B of the receiver 72 when the ejection member 50A is located at the eject position (i.e. when the pivot stopper 56 and the shell-side stopper 32 are brought into abutment with each other). Accordingly, the backup portion 80A is brought into abutment with the rear surface 72B to backup the receiver 72 when the excessive force along the negative X-direction is applied to the receiver 72.

As shown in FIGS. 9 to 12, the backup portion 80A may be formed on another member (for example, on the cover shell 30A) than the ejection member 50A. However, if the backup portion 80 is formed as a part of the ejection member 50 similar to the aforementioned embodiment shown in FIGS. 1 to 8, the receiver 72 and the backup portion 80 may be positioned more easily. It is therefore preferred that the backup portion 80 and the ejection member 50 be formed integrally similar to the aforementioned embodiment.

The present application is based on a Japanese patent applications of JP2011-217858 filed before the Japan Patent Office on Sep. 30, 2011, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is able to accommodate at least a part of an object, the connector comprising:
   an ejection member pivotable between an eject position and an accommodating position, the ejection member including a receiver and an ejecting portion, the receiver having a front surface and a rear surface, the front surface of the receiver being arranged so as to be pressed along a pressing direction by using an operating member which is other than the connector, the ejection member being designed to pivot from the accommodating position to the eject position when the front surface is pressed along the pressing direction, the ejecting portion ejecting the object along an ejecting direction opposite to the pressing direction when the ejection member pivots toward the eject position; and
   a backup portion located within a predetermined range in a vertical direction perpendicular to the ejecting direction, an upper end and a lower end in the vertical direction of the receiver defining an upper limit and a lower limit of the predetermined range, respectively, the backup portion being brought into abutment with the rear surface of the receiver when the front surface of the receiver receives a force which is so excessive as to force the ejection member to pivot beyond the eject position, the abutment of the backup portion backing up the receiver.

2. The connector as recited in claim 1, wherein the backup portion is integrally formed with the ejection member.

3. The connector as recited in claim 1, the connector further comprising:
a contact;
a holding member holding the contact; and
a cover shell which forms, together with the holding member, an accommodating portion configured to accommodate the object, wherein
the ejection member is supported by the cover shell so as to be pivotable.

4. The connector as recited in claim 3, wherein:
the ejection member is provided with a pivot stopper, the pivot stopper being located within the predetermined range; and
the cover shell is provided with a shell-side stopper, the shell-side stopper being brought into abutment with the pivot stopper when the ejection member is located at the eject position.

5. The connector as recited in claim 4, wherein when the predetermined range is divided into three equal ranges in the vertical direction, the backup portion and the pivot stopper are located within a middle range of the three ranges.

6. The connector as recited in claim 1, wherein the ejection member is formed by bending a single metal plate.

7. The connector as recited in claim 6, wherein a distance between the receiver and the backup portion is less than or equal to a plate thickness of the metal plate under a state where a force is not applied to the receiver.

8. The connector as recited in claim 1, wherein when the predetermined range is divided into three equal ranges in the vertical direction, the ejecting portion is located within a middle range of the three ranges.

9. The connector as recited in claim 1, wherein the backup portion has a plate-like shape extending in a plane perpendicular to the vertical direction.

10. The connector as recited in claim 9, wherein the backup portion tapers as extends away from a center of pivot of the ejection member.

11. The connector as recited in claim 1, wherein:
the ejection member has a receive portion which is configured to receive a leading end of the operating member; and
the receiver is a furthest wall of the receive portion in the pressing direction.

12. The connector as recited in claim 11, wherein the receive portion has a boxlike shape.

13. The connector as recited in claim 1, wherein the ejecting portion and the receiver are provided on opposite sides across a center of pivot of the ejection member, respectively.

14. The connector as recited in claim 1, wherein the object is a tray on which a card configured to be connected to the connector is mountable; and
the tray is provided with an insertion hole, the operating member being inserted into the insertion hole when the operating member presses the receiver.

* * * * *